United States Patent [19]

Kobsa

[11] Patent Number: 5,265,141
[45] Date of Patent: Nov. 23, 1993

[54] CAPTIVE FASTENER

[75] Inventor: Irvin R. Kobsa, San Jose, Calif.

[73] Assignee: General Electric Company, San Jose, Calif.

[21] Appl. No.: 932,136

[22] Filed: Aug. 19, 1992

[51] Int. Cl.$^5$ ................................................ G21C 3/32
[52] U.S. Cl. ...................................... 376/446; 376/463
[58] Field of Search ............... 376/463, 453, 461, 434, 376/285, 446; 976/DIG. 167, DIG. 171; 411/109, 45

[56] References Cited

U.S. PATENT DOCUMENTS

| | | | |
|---|---|---|---|
| 3,180,390 | 4/1965 | Ockert, Jr. | 151/69 |
| 3,192,980 | 7/1965 | Sauter | 151/41.5 |
| 3,508,774 | 4/1970 | Simonson | 287/189.36 |
| 4,031,935 | 6/1977 | Jones et al. | 151/41.76 |
| 4,036,692 | 7/1977 | Walton | 176/76 |
| 4,069,102 | 1/1978 | Berringer et al. | 376/463 |
| 4,078,471 | 3/1978 | Archibald et al. | 85/67 |
| 4,219,386 | 8/1980 | Osborne et al. | 376/434 |
| 4,668,469 | 5/1987 | Widener | 376/446 |
| 4,684,284 | 8/1987 | Bradley, Jr. | 403/320 |
| 4,738,820 | 4/1988 | Wilson et al. | 376/446 |
| 4,810,145 | 3/1989 | Villas | 411/206 |
| 4,854,795 | 8/1989 | Duran | 411/352 |
| 4,980,117 | 12/1990 | Blaushild | 376/205 |

Primary Examiner—Donald P. Walsh
Assistant Examiner—Meena Chelliah
Attorney, Agent, or Firm—J. S. Beulick

[57] ABSTRACT

A captive fastener is joinable to a stud for being retained in a nuclear reactor. The fastener includes a head fixedly joinable to the stud, and at least one spring clip extending perpendicularly from the head and having a proximal end fixedly joined thereto, and a distal end in the form of hook for retaining the fastener in the reactor. The hook is resiliently deflectable laterally relative to the head for allowing assembly and disassembly.

10 Claims, 4 Drawing Sheets

CAPTIVE FASTENER

The present invention relates generally to nuclear reactors, and, more specifically, to a captive fastener therein for preventing liberation of the fastener during operation of the reactor.

BACKGROUND OF THE INVENTION

A nuclear reactor such as a boiling water reactor (BWR) includes a reactor core which generates heat for boiling water to generate steam which is used for powering a turbine-generator, for example. The reactor also includes a pressure vessel partially filled with water and containing an annular core shroud therein which surrounds and supports the reactor core. For example, a bottom core plate may be bolted to the core shroud for supporting the core thereto.

The core shroud is spaced radially inwardly from the pressure vessel to define an annular downcomer through which recirculation water is channeled downwardly to the bottom of the pressure vessel where it is turned upwardly for flow through the core. Disposed at the bottom of the downcomer is an annular pump deck which is fixedly joined at its outer perimeter to the pressure vessel and at its inner circumference to the core shroud typically by being welded thereto or by being bolted thereto.

Accordingly, the bottom core plate may be bolted to the core shroud, and the core shroud itself may be bolted to the pump deck by conventional bolts which are relatively large and relatively heavy for handling the large loads channeled therethrough. For example, these bolts may be about 5 cm in diameter and about 45 cm in length, with each bolt weighing about 10 kg.

In the environment of the nuclear reactor, safety considerations require that each of the bolts, including its several components, is fixedly attached to the core shroud or pump deck to prevent the liberation of any part thereof during operation of the reactor, which liberated part could result in damage to other parts of the reactor.

Since these large bolts are used in a reactor, they are usually low-volume parts made to specification, and are not, therefore, mass produced. To prevent excessive cost of manufacture, the bolts are typically made from threaded studs, with corresponding nuts being disposed at both ends of the stud for clamping together the required components. One of the nuts is, therefore, typically welded to the stud to prevent its disassembly therefrom, and it is also welded to one of the members or plates being bolted together to prevent its liberation therefrom. The other nut is suitably tightened on the stud for clamping together the respective members or plates, and is prevented from loosening by a conventional hexagonal socket keeper which surrounds the nut and which is itself welded to the other member being clamped together. In the event of failure of the stud by a fracture therethrough at any axial location between the two nuts, each of the nuts is fixedly joined to its respective plate and each of the severed stud halves is retained by the respective nut. In this way, neither the nuts themselves nor the stud segments are liberated from the joint and therefore cannot be entrained with the recirculation flow to cause damage to parts of the reactor downstream therefrom.

However, a fastener arrangement such as that described above including a stud and two corresponding nuts at opposite ends thereof requires suitable access to both sides of the stud on both sides of the members being clamped together. In a nuclear reactor, space is typically limited within the pressure vessel making it difficult if not impossible to access both nuts for assembly and welding especially after buildup of the reactor. It is desirable to provide an improved fastener assembly which is captive in the reactor but which also allows improved assembly and disassembly thereof both for initial buildup of the reactor as well as for subsequent maintenance outages in which components such as the core shroud or bottom core plate are removed for replacement. Or, for replacement of the fasteners themselves either for preventive maintenance or upon failure thereof.

SUMMARY OF THE INVENTION

A captive fastener is joinable to a stud for being retained in a nuclear reactor. The fastener includes a head fixedly joinable to the stud, and at least one spring clip extending perpendicularly from the head and having a proximal end fixedly joined thereto, and a distal end in the form of hook for retaining the fastener in the reactor. The hook is resiliently deflectable laterally relative to the head for allowing assembly and disassembly.

BRIEF DESCRIPTION OF THE DRAWING

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
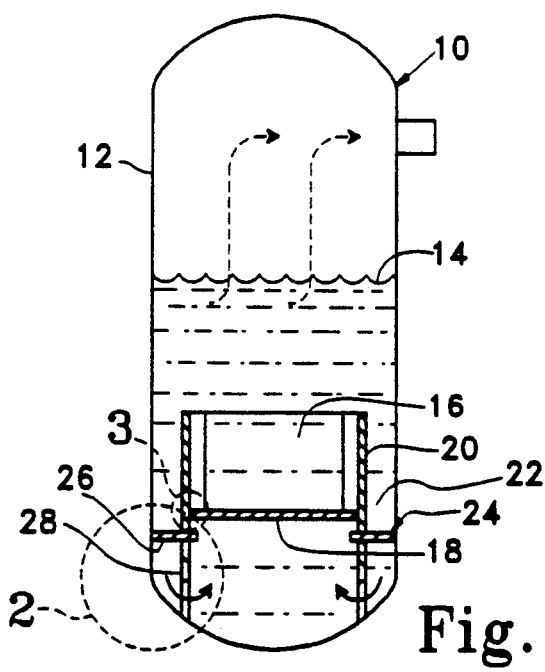
FIG. 1 is a schematic representation of an exemplary boiling water reactor having a core shroud including captive fasteners in accordance with one embodiment of the present invention.

Illustrated schematically in FIG. 1 is a nuclear reactor 10, such as a boiling water reactor (BWR), which includes a conventional pressure vessel 12 partially filled with water 14 in which is submerged a conventional nuclear reactor core 16. The core 16 includes a bottom core plate 18 which is fixedly joined to a conventional annular core shroud 20 in accordance with one embodiment of the present invention. The core shroud 20 is spaced radially inwardly from the sides of the pressure vessel 12 to define an annular downcomer 22 through which the water 14 is recirculated downwardly for flow to the bottom of the pressure vessel 12 and then upwardly through the reactor core 16 wherein it is heated for generating steam which is discharged from the pressure vessel 12 for powering a turbine-generator (not shown), for example.

An annular shroud support 24 is disposed below the core shroud 20 and includes an annular pump deck 26 extending horizontally from the side walls of the pressure vessel 12 and which is fixedly joined to a vertical support cylinder 28 extending downwardly to the lower head of the pressure vessel 12. More specifically, the annular pump deck 26 is disposed at the bottom of the downcomer 22 and is fixedly joined, by welding for example, at its outer perimeter to the pressure vessel 12 and is fixedly joined at its inner circumference to the shroud support 28 which extends vertically below the core shroud 20 to the lower head of the pressure vessel 12.

Figure 2:
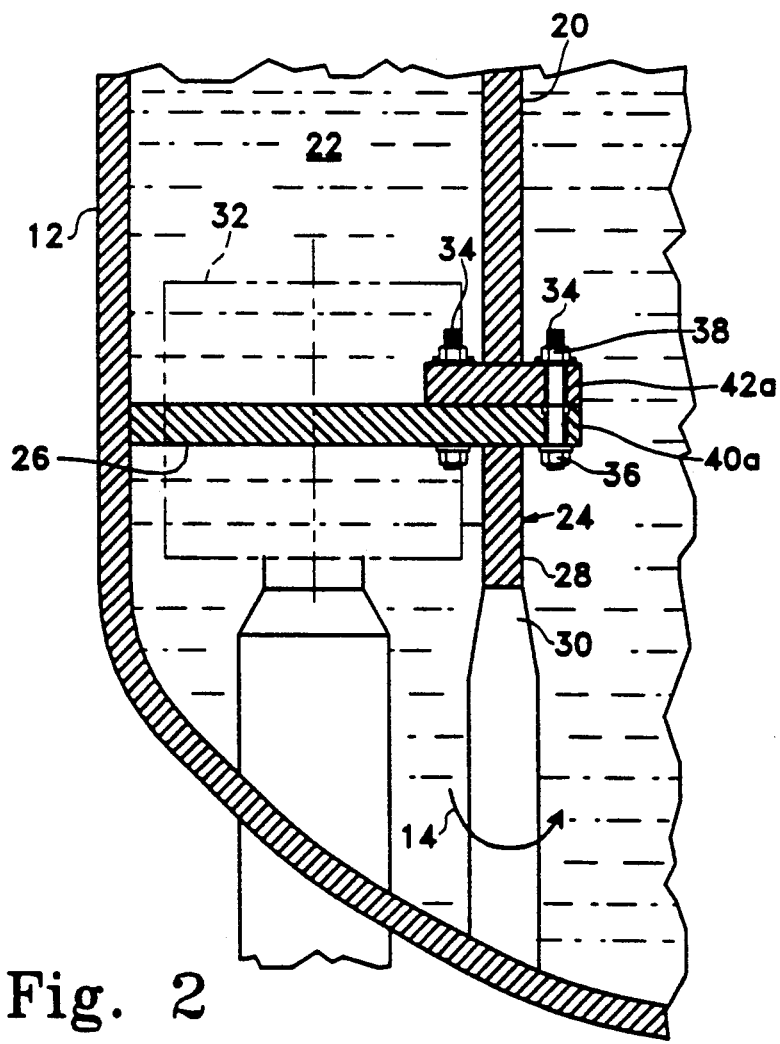
FIG. 2 is an enlarged elevation view of a portion of the reactor illustrated in FIG. 1 within the circle labeled 2.

As shown in more particularity in FIG. 2, the shroud support 24 includes apertures 30 therein for allowing the water 14 in the downcomer 22 to turn and flow upwardly for recirculation through the reactor core 16. A plurality of conventional reactor internal pumps (RIPs) 32, shown in phantom, are suitably joined to the pump deck 26 and are effective for pumping the water 14 downwardly through the pump deck 26 for flow through the reactor core 16.

The core shroud 20 is removably fixedly joined to the shroud support 24 by a plurality of circumferentially spaced apart studs 34 each having a captive fastener 36 in the exemplary form of a nut at one end thereof in accordance with one embodiment of the present invention, and by a conventional second nut 38 at an opposite end thereof, which nuts 36, 38 are suitably threadingly fastened to the studs 34 for joining the core shroud 20 to the shroud support 24 in this exemplary embodiment.

Figure 3:
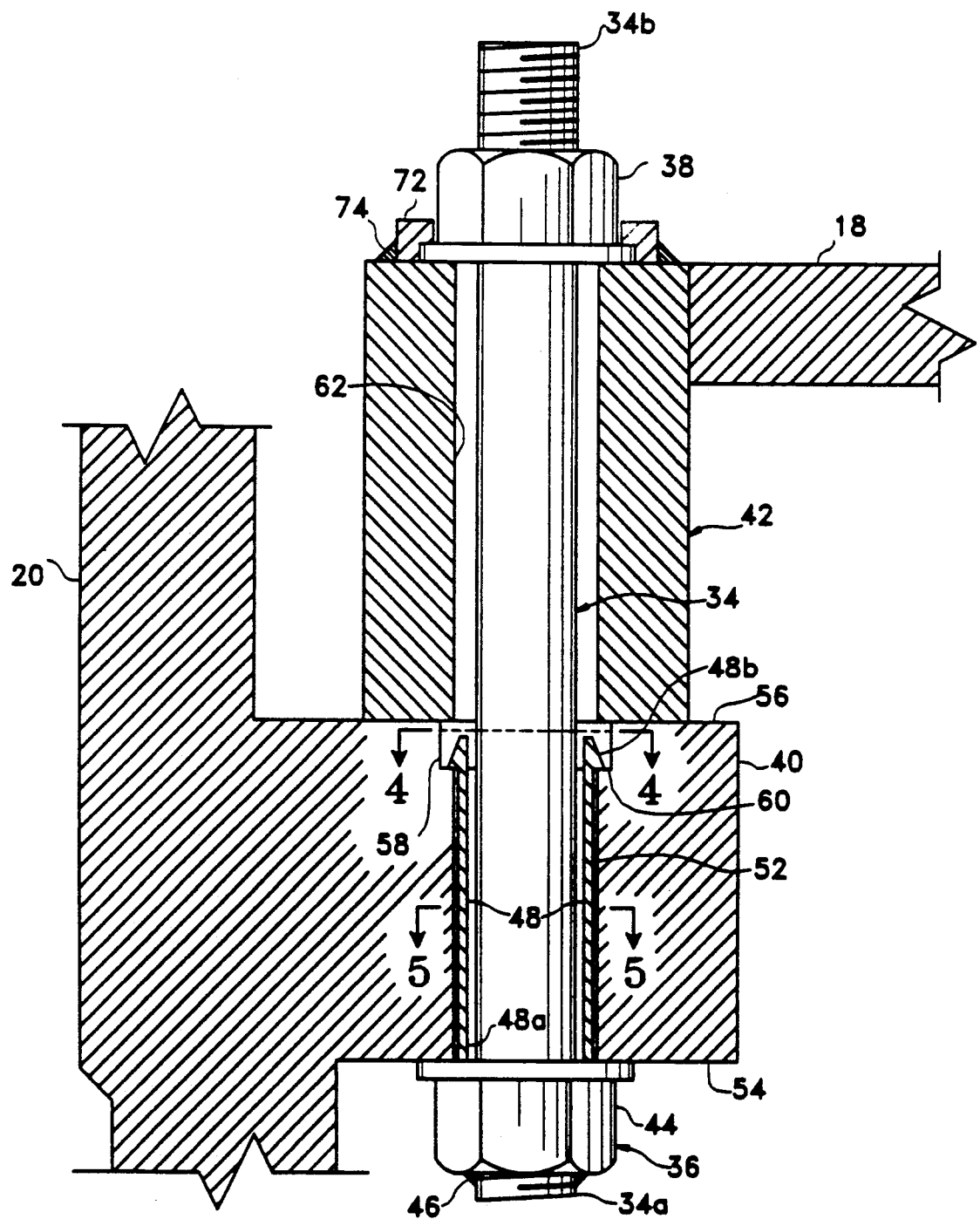
FIG. 3 is an enlarged, elevation, partly sectional view of a portion of the reactor illustrated in FIG. 1 within the circle labeled 3.
Figure 4:
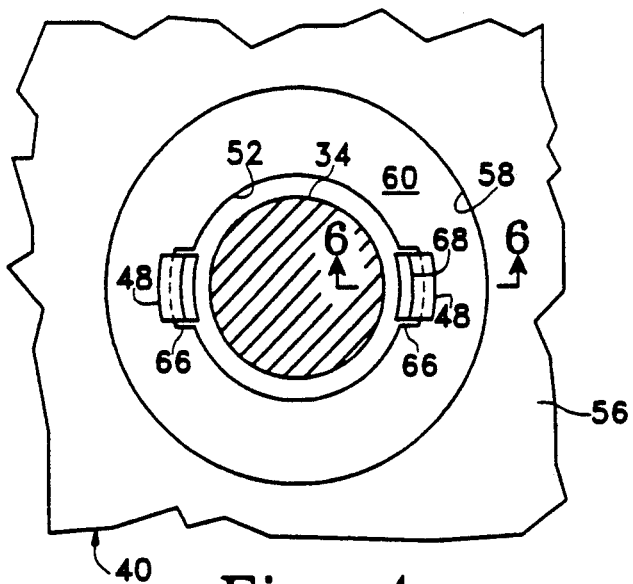
FIG. 4 is a transverse, partly sectional view of the fastened joint illustrated in FIG. 3 taken along line 4—4.

Illustrated in FIG. 3 is another fastened joint in which the studs 34, nuts 38, and captive fasteners or nuts 36 in accordance with the present invention may also be used for joining together the bottom core plate 18 to the core shroud 20.

More specifically, and referring to the FIG. 3 embodiment, the captive fastener 36 in accordance with the present invention is used in combination with a first place, or support plate, 40, which in the embodiment illustrated in FIG. 3 is in the form of an annular flange formed integrally with the core shroud 20 at an intermediate portion thereof. Clamped to the first plate 40 is a complementary, annular second plate 42 which is in the exemplary form of an annular flange integrally joined to the outer perimeter of the bottom core plate 18 for supporting the core plate 18 and in turn the reactor core 16. The second plate 42 rests upon the first plate 40 and is fastened thereto by the stud 34, captive fastener 36, and nut 38 in accordance with the present invention.

A similar fastened joint is illustrated in the FIG. 2 embodiment wherein the first plate, designated 40a, is the radially inner end of the pump deck 26 joined to the support cylinder 28 below the core shroud 20. And, the second plate, designated 42a, is an annular flange at the bottom of the core shroud 20 which joins the core shroud 20 to the shroud support 24 in accordance with another embodiment of the present invention.

In both FIGS. 2 and 3, analogous first plates 40, 40a are joined to the bottom of analogous second plates 42, 42a by the studs 34 extending therethrough, with the captive fasteners 36 being used in accordance with the present invention to prevent liberation thereof during operation of the reactor so that the captive fasteners 36 and the studs 34 to which they are joined are prevented from falling by gravity into the recirculating water flow 14 which could lead to damage of other components in the reactor 10. In view of the similarity of the two embodiments of the captive fasteners 36, the FIG. 3 embodiment will be described in more detail below with it being understood that the invention is applicable also to the embodiment illustrated in FIG. 2.

As described above, the captive fastener 36 in accordance with the exemplary embodiment is in the form of a conventional nut, or head 44 which is fixedly joinable to the stud 34 at its distal end 34a by being conventionally welded therethrough at weld joints 46 as shown in FIG. 3, or by being formed integrally therewith as in a conventional head of a bolt (not shown). Extending perpendicularly upwardly from the head 44 is at least one, and preferably a pair of elongate, spring clips 48 spaced apart from each other for accommodating the stud 34 therebetween. Further details of the captive fastener 36 in combination with the first plate 40 are additionally shown in FIGS. 4–7. Shown most clearly in FIGS. 3 and 7, the clips 48 extend perpendicularly upwardly from the head 44, with each clip 48 having a proximal end 48a fixedly joined to the head 44, by being welded thereto at a weld joint 50, for example, and a distal end in the form of a hook 48b for retaining the fastener 36 in the reactor 10. The clips 48 are joined to the head 44 on opposite sides of the stud 34 and extend parallel thereto, and are spaced therefrom to allow the clips 48 to be resiliently or elastically deflected toward the stud 34 during assembly. The hook 48b is initially resiliently deflected laterally relative to the head 44 so that the fastener 36 may be retained by the first plate 40.

More specifically, the fastener 36 is removably joined to the first plate 40 in accordance with the present invention through a bore 52 extending perpendicularly through the first plate 40 as shown in FIG. 3 from a bottom surface 54 thereof toward a top surface 56 thereof. The first plate 40 also includes a counterbore 58 extending perpendicularly into the first plate 40 from the top surface 56 toward the bottom surface 54 and coaxially with the bore 52, with the counterbore 58 having an annular seat 60 surrounding the top of the bore 52 which captures the hooks 48b.

As shown in FIG. 3, the second plate 42 is positioned on the first plate 40 for supporting its weight, and includes an aperture 62 for receiving a proximal end 34b of the stud 34 which extends upwardly past the top of the second plate 42. The nut 38 is threadingly fixedly joined to the stud proximal end 34b against the top of the second plate 42 for clamping or joining together the first and second plates 40 and 42. Accordingly, the stud 34 extends upwardly through the bore 52 and counterbore 58 of the first plate 40 and then through the aperture 62 of the second plate 42, with its proximal end 34b being suitably spaced above the top surface 56 of the first plate 40 for joining thereto the second plate 42. The clips 48 extend vertically through the bore 52 from the first plate bottom surface 54 to the counterbore seat 60, with the hooks 48b being disposed on the seat 60 for retaining the fastener 36 and the stud 34 joined thereto to the first plate 40 for supporting the weight thereof. The studs 34 used in this nuclear reactor embodiment are relatively large and heavy and may have, for example, an outer diameter of about 5 cm and a length of about 45 cm and weight of about 10 kg. The clips 48 must, therefore, provide a substantial retention force to support the weight of at least the fastener 36 itself as well as the weight of the entire stud 34 against the force of gravity to prevent the stud 34 and fastener 36 from falling during assembly thereof to the first plate 40, as well as preventing the liberation of the fastener 36 during operation in the event of a fracture failure of the stud 34 itself.

Figure 6:
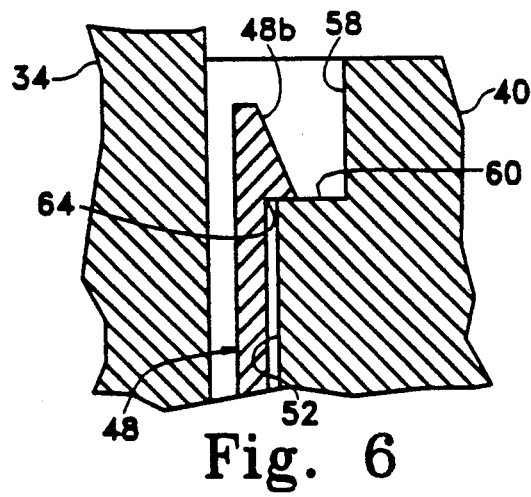
FIG. 6 is an elevation, sectional view of a portion of one of the spring clips of the captive fastener illustrated in FIG. 4 taken along line 6—6.

As shown in more particularity in FIG. 6, each of the hooks 48b preferably includes a L-shaped latch corner 64 which is complementary in configuration to the corner of the counterbore seat 60 at the bore 52 for retention on the counterbore seat 60 to prevent the clip 48, and in turn the fastener 36 and stud 34, from being unintentionally removed from the first plate 40 after assembly or during operation of the reactor.

Figure 5:
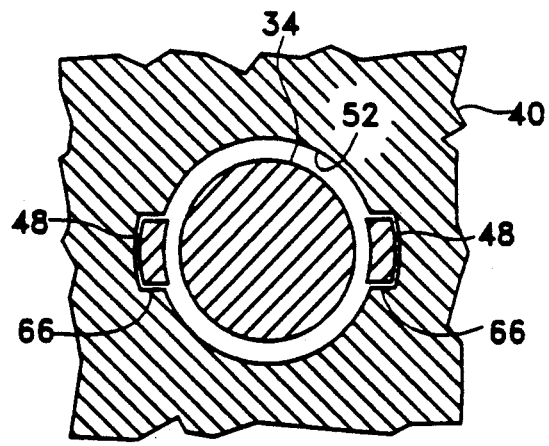
FIG. 5 is a transverse sectional view of the fastened joint illustrated in FIG. 3 taken along line 5—5.

In order to prevent the fastener 36 from rotating during operation due to vibration, for example, the first plate bore 52 as illustrated in FIG. 5 preferably includes a pair of elongate, vertically extending slots 66 extending parallel to the stud 34 and the clips 48 for receiving the pair of clips 48 therein, respectively, to restrain unlimited rotation of the fastener 36 relative to the first plate 40 about the stud 34. In this way, any rotation of the fastener head 44 during operation due to vibration, will cause the clips 48 to abut the side surfaces of the respective slots 66 preventing their rotation therepast.

This improved capture arrangement allows the stud 34 itself to remain a solid, unchanged part having its full tension load capability which is not degraded or affected by stress risers from its capture. The clips 48 are preferably joined solely to the fastener head 44 and spaced radially from the stud 34 which, therefore, is unaffected by the clips 48. The clips 48 directly join the fastener head 44 to the first plate 40 for retaining it thereto and preventing rotation thereof. Since the stud 34 is welded to the fastener head 44 at the weld joint 46, it too is prevented from rotation during operation by the clips 48, as well as being retained vertically in the bore 52.

Figure 7:
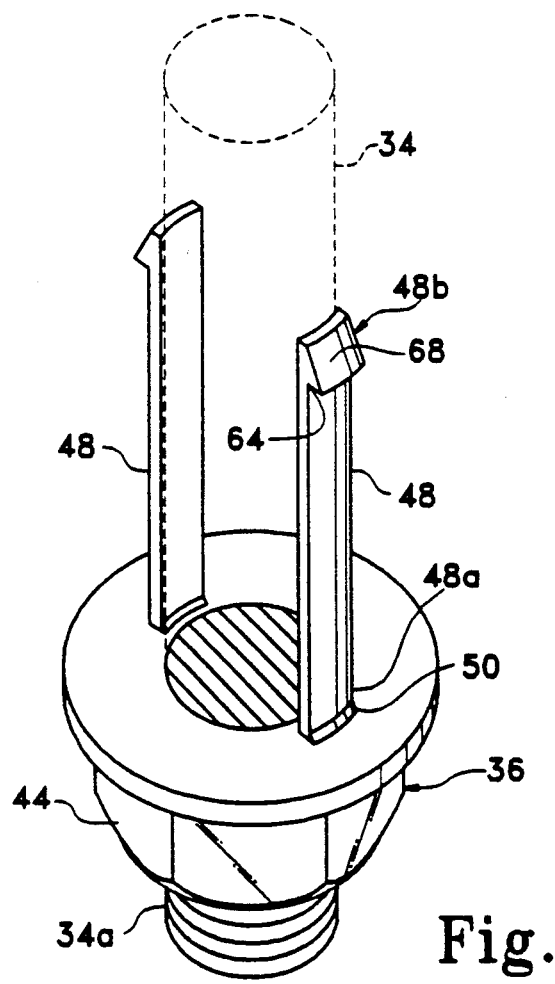
FIG. 7 is a perspective view of the captive fastener illustrated in FIG. 3 joined to a stud extending therethrough.
Figure 8:
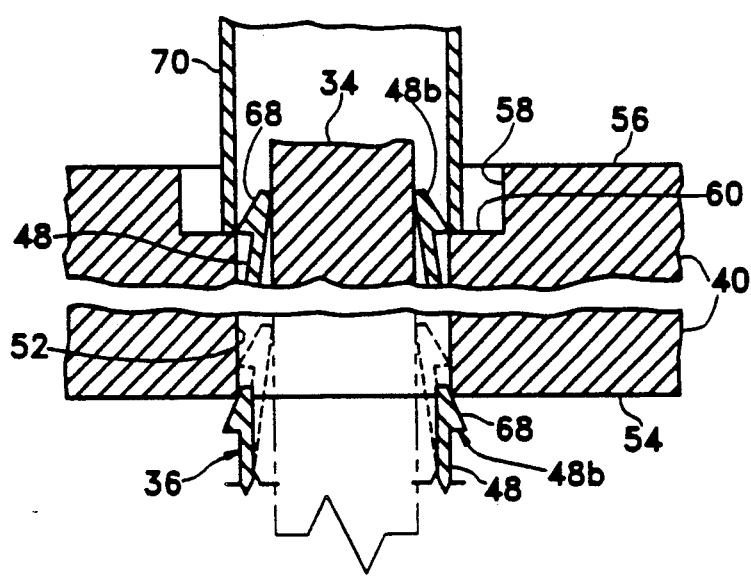
FIG. 8 is an elevation, sectional view of a portion of the fastened joint illustrated in FIG. 3 showing assembly and disassembly of the captive fastener therein.

In order to allow the fastener 36 to be assembled to the first plate 40, each of the hooks 48b preferably further includes an inclined cam surface 68 as shown in FIGS. 7 and 8 which is inclined relative to the clip 48 and the stud 34. The clips 48 are configured or sized for insertion upwardly through the bore 52 as shown in FIG. 8, with the bore 52 resiliently deflecting the opposing clips 48 toward each other as the clips 48 are inserted upwardly therein. When the compressed together hooks 48b enter the counterbore 58 they return to their original, undeflected position as shown in FIGS. 3 and 6, with the latch corners 64 being disposed on the counterbore seat 60 for retaining the fastener 36 and the stud 34 to the first plate 40.

In the event it is desired to disassemble the fastener 36 from the first plate 40, the clips 48 must be compressed toward each other and against the stud 34 to unlatch the hooks 48b from the counterbore seat 60 so that the fastener 36 may be withdrawn downwardly therefrom. A relatively simple tubular tool 70 as shown in FIG. 8 may be used to ride downwardly over the cam surfaces 68 for compressing together the opposing clips 48 so that the hooks 48b may be withdrawn downwardly through the first bore 52 without obstruction by the counterbore seat 60. In this way, the fastener 36 and the stud 34 joined thereto may be removed from the first and second plates 40 and 42 as desired during a maintenance outage, for example.

The fastener 36 and its clips 48 preferably enter the first plate 40 from below as shown in FIGS. 3 and 8 so that the stud proximal end 34b extends upwardly and is readily accessible. Once the bottom core plate 18 is positioned downwardly on top of the several studs 34, access to the bottom surface 54 of the first plate 40 is limited which increases the difficulty of conventionally welding the fastener head 44 to the bottom of the first plate 40 and, therefore, the clips 48 used instead provide a substantial improvement. Since the stud proximal end 34b extends upwardly, it is more readily accessible even after the bottom core plate 18 is inserted thereover. The nut 38 is conventionally torqued to the stud 34 and a conventional hexagonal nut keeper 72 is suitably positioned over the nut 38 and welded to the second plate 42 at weld joint 74. The nut keeper 72 conventionally prevents the nut 38 from rotating during operation of the reactor as well as retains the nut 38 and the top of the stud 34 from liberation in the event of a fracture failure severing the stud 34 between the fastener 36 and the nut 38. Of course, the captive fastener 36 may be used in any orientation and in various sizes, and with various studs 34 for joining together various members such as the first and second plates 40 and 42 shown in FIG. 3 or the first and second plates 40a and 42a shown in FIG. 2.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A captive fastener joinable to a stud for being retained in a nuclear reactor comprising:
   a head adapted to be fixedly joined to said stud; and
   at least one spring clip extending perpendicularly from said head and having a proximal end fixedly joined thereto, and a distal end in the form of a hook for retaining said fastener in said reactor, said clip being joined to said head for spacing said hook from said stud, with said hook being resiliently deflectable laterally relative to said head and toward said stud.

2. A fastener according to claim 1 further including a pair of said spring clips spaced apart from each other for accommodating said stud therebetween, and wherein said clips are joined to said head for extending parallel to said stud and for being spaced therefrom to allow said clips to be selectively resiliently deflected toward said stud.

3. A fastener according to claim 2 in combination with said stud and a first plate including:
   top and bottom surfaces;
   a bore extending perpendicularly through said first plate from said bottom surface toward said top surface; and
   a counterbore extending perpendicularly into said first plate from said top surface coaxially with said bore, and having an annular seat surrounding said bore; and
   wherein said stud extends through said bore and counterbore of said first plate and includes a proximal end spaced above said first plate top surface for joining thereto a second plate, and a distal end fixedly joined to said fastener; and said clips extend through said bore from said first plate bottom surface to said counterbore seat, and said clip hooks being disposed on said seat for retaining said fastener and said stud to said first plate.

4. A fastener combination according to claim 3 wherein said first plate bore includes a pair of elongate slots extending parallel to said stud and said pair of clips for receiving said clips therein, respectively, to restrain rotation of said fastener.

5. A fastener combination according to claim 4 wherein each of said hooks includes an L-shaped latch corner configured for retention on said counterbore seat to prevent said clips, and in turn said fastener and said stud, from being unintentionally removed from said first plate.

6. A fastener combination according to claim 5 wherein each of said hooks further includes an inclined cam surface configured for insertion through said bore, with said bore resiliently deflecting said clips toward each other as said clips are inserted therein until said hooks enter said counterbore for undeflecting said clips and positioning said latch corners on said counterbore seat for retaining said fastener and said stud to said first plate.

7. A fastener combination according to claim 6 in further combination with said second plate positioned on said first plate, said second plate including an aperture receiving said stud proximal end, and a nut fixedly joined to said stud proximal end against said second plate for joining together said first and second plates.

8. A fastener combination according to claim 7 wherein:
said second plate is an annular flange of a core shroud surrounding a reactor core in said nuclear reactor; and
said first plate is a radially inner end of a pump deck joined to a support cylinder disposed below said core shroud.

9. A fastener combination according to claim 7 wherein:
said first plate is an annular flange of a core shroud surrounding a reactor core in said nuclear reactor; and
said second plate is an annular flange of a bottom core plate supporting said reactor core.

10. A fastener combination according to claim 7 wherein said clips extend vertically for supporting the weight of both said fastener and said stud to said first plate.

* * * * *